US008897689B2

(12) United States Patent
Sone et al.

(10) Patent No.: US 8,897,689 B2
(45) Date of Patent: Nov. 25, 2014

(54) IMAGE FORMING APPARATUS AND IMAGE FORMING INFORMATION PROCESSING APPARATUS

(75) Inventors: Takuroh Sone, Kanagawa (JP); Kei Yasutomi, Tokyo (JP); Kazuki Funahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 310 days.

(21) Appl. No.: 13/483,351

(22) Filed: May 30, 2012

(65) Prior Publication Data
US 2012/0320386 A1 Dec. 20, 2012

(30) Foreign Application Priority Data

Jun. 16, 2011 (JP) ................................. 2011-134492
Mar. 7, 2012 (JP) ................................. 2012-050291

(51) Int. Cl.
*G03G 15/20* (2006.01)
*G03G 15/01* (2006.01)
*G03G 15/00* (2006.01)
*H04N 1/46* (2006.01)

(52) U.S. Cl.
CPC .. *G03G 15/6585* (2013.01); *G03G 2215/00805* (2013.01); *G03G 15/0189* (2013.01); *G03G 2215/0129* (2013.01); *G03G 2215/0081* (2013.01); *H04N 1/46* (2013.01)
USPC ........................................... 399/341; 399/39

(58) Field of Classification Search
USPC .................................................. 399/341, 39
See application file for complete search history.

(56) References Cited

U.S. PATENT DOCUMENTS

2006/0044617 A1* 3/2006 Wang et al. ................... 358/3.06
2010/0014120 A1* 1/2010 Nishiyama ................... 358/3.01

FOREIGN PATENT DOCUMENTS

| JP | 02-224568 A | 9/1990 |
| JP | 2001-175022 A | 6/2001 |
| JP | 2008-532065 A | 8/2008 |
| JP | 2008-200895 A | 9/2008 |
| JP | 2009-083457 A | 4/2009 |
| JP | 2009-092767 A | 4/2009 |
| WO | WO-2006/091365 A1 | 8/2006 |

* cited by examiner

*Primary Examiner* — Billy Lactaoen
(74) *Attorney, Agent, or Firm* — Harness, Dickey & Pierce, P.L.C.

(57) ABSTRACT

An image forming apparatus has an image forming information processor to process image forming information and an image forming unit to form an image on a recording medium by forming a toner image using colored-toner and a toner image using glossy toner based on the image forming information processed by the image forming information processor. The image forming unit forms a glossy image on the recording medium based on glossy toner image forming information, in which the glossy image is formable on the recording medium using the colored-toner toner image alone, or a glossy image is formed on the recording medium by forming a colored-toner toner image using colored-toner based on the colored-toner image forming information, and then forming the glossy toner image on the colored-toner toner image as a top layer of the glossy image based on the glossy toner image forming information.

15 Claims, 8 Drawing Sheets

| LAMÉ DOT NUMBER (DOTS/cm²) \ LAMÉ DOT SIZE (mm²) | 0.10 | 0.49 | 1.00 | 1.56 |
|---|---|---|---|---|
| 10 | △ | △ | △ | × |
| 50 | ○ | ○ | ○ | △ |
| 100 | ◎ | ○ | — | — |
| 250 | ◎ | — | — | — |

| 60-DEGREE GLOSSINESS AT LAMÉ DOT AREA (%) | POD GLOSS COAT SHEET (GLOSSINESS OF SOLID PART OF TEXT: 30%) | POD MAT COAT SHEET (GLOSSINESS OF SOLID PART OF TEXT: 7%) |
|---|---|---|
| 10 | × | × |
| 20 | △ | ○ |
| 40 | ○ | ◎ |
| 60 | ◎ | ◎ |

FIG. 15

| DOT AREA RATIO (%) C&M | WHITENESS | SUBJECTIVE EVALUATION RESULT |
|---|---|---|
| 1 | 97.4 | ◎ |
| 2 | 97.2 | ◎ |
| 3 | 97.0 | ◎ |
| 4 | 96.8 | ◎ |
| 5 | 97.0 | ◎ |
| 6 | 97.0 | ◎ |
| 7 | 96.5 | ◎ |
| 8 | 95.2 | ◎ |
| 9 | 95.3 | ◎ |
| 10 | 94.7 | ◎ |
| 11 | 92.8 | ◎ |
| 12 | 92.9 | ◎ |
| 13 | 92.0 | ◎ |
| 14 | 90.9 | ◎ |
| 15 | 89.3 | ◎ |
| 16 | 87.6 | ○ |
| 17 | 86.7 | ○ |
| 18 | 85.2 | ○ |
| 19 | 81.1 | ○ |
| 20 | 80.8 | ○ |
| 21 | 79.2 | △ |
| 22 | 78.4 | △ |
| 23 | 76.3 | × |
| 24 | 76.8 | × |
| 25 | 75.7 | × |

IMAGE FORMING APPARATUS AND IMAGE FORMING INFORMATION PROCESSING APPARATUS

CROSS-REFERENCE TO RELATED APPLICATIONS

This application claims priority to Japanese Patent Application Nos. 2011-134492, filed on Jun. 16, 2011, and 2012-050291, filed on Mar. 7, 2012 in the Japan Patent Office, which are incorporated by reference herein in their entirety.

BACKGROUND

1. Technical Field

The present invention relates to an image forming apparatus and an image forming information processing apparatus that can form images having a lamé effect in an image forming process using toner.

2. Description of the Background Art

The printing field includes special printing techniques such as pearl metallic printing, hologram printing, lamé printing, flexo printing, decomat printing, and scratch printing. Such special printing may use special ink, prepared by mixing special material, to create special visual effects. In the image forming process using electrophotography, visual effects created by such special printing can be devised by mixing in metal pieces, thin scale pieces, or scale-like pigments as colorants of the toner used for image forming. However, such special-materials-mixed toner is difficult to use because the electrophotographic image forming process, which uses static electricity, sets some limits on the properties of the toner and coloring agents, such as toner size and chargeability.

Lamé printing, which is one type of special printing, forms lamé images having a visual effect such as sporadic presence of glittering particles. If such lamé images are formed by electrophotography, the toner is required to include particles such as synthetic mica. However, such synthetic-mica-mixed toner is difficult to use in the electrophotographic image forming process because of the above-described limitations on the properties of the toner and coloring agents.

JP-4535112-B discloses a technique for forming metallic images using transparent toner instead of metal pieces or the like. In particular, JP-4535112-B discloses: grayscale values of pixels in the area used for forming metallic images are changed; color images are formed based on the changed grayscale values; and transparent toner is superimposed on the color images to form transparent images; then the metallic images are formed. Accordingly, the hue of the images does not change much and a metallic image effect can be achieved. However, a lamé image effect such as glittering particles cannot be achieved. Moreover, in JP-4535112-B, the fact that the transparent toner coats the entire area of the metallic images also prevents a lamé image from being achieved.

JP-2001-175022-A discloses a technique of using transparent toner having a melt viscosity set smaller than a melt viscosity of colored toner to form high quality images. However, although JP-2001-175022-A discloses the transparent toner, it does not disclose formation of special images such as lamé images.

SUMMARY

In one aspect of the present invention, an image forming apparatus is devised. The image forming apparatus includes an image forming information processor and an image forming unit. The image forming information processor processes image forming information converted from image information, input to the image forming apparatus. The image forming information processor includes a first area determination unit to determine a processing area from the image forming information; a second area determination unit to determine a plurality of specific areas included in the processing area determined by the first area determination unit as processing-required part; a color level changing unit to change color level of image forming information corresponding to the plurality of specific areas; a colored-toner image forming information generator to generate colored-toner image forming information based on the image forming information having the color level changed by the color level changing unit; and a glossy toner image forming information generator to generate glossy toner image forming information based on the image forming information corresponding to the plurality of specific areas. The image forming unit forms an image on a recording medium by forming a toner image using colored-toner, and a toner image using glossy toner based on the image forming information processed by the image forming information processor. The image forming unit forms a glossy image on the recording medium based on the glossy toner image forming information, in which the glossy image is formable on the recording medium using the colored-toner toner image alone, or the glossy image is formed on the recording medium by forming a colored-toner toner image using colored-toner based on the colored-toner image forming information, and then forming the glossy toner image on the colored-toner toner image as a top layer of the glossy image based on the glossy toner image forming information.

BRIEF DESCRIPTION OF THE DRAWINGS

A more complete appreciation of the disclosure and many of the attendant advantages and features thereof can be more readily obtained and understood from the following detailed description with reference to the accompanying drawings, wherein:

FIG. 15 shows subjective evaluation test results of test 3 according to a third example embodiment.

Figure 1:
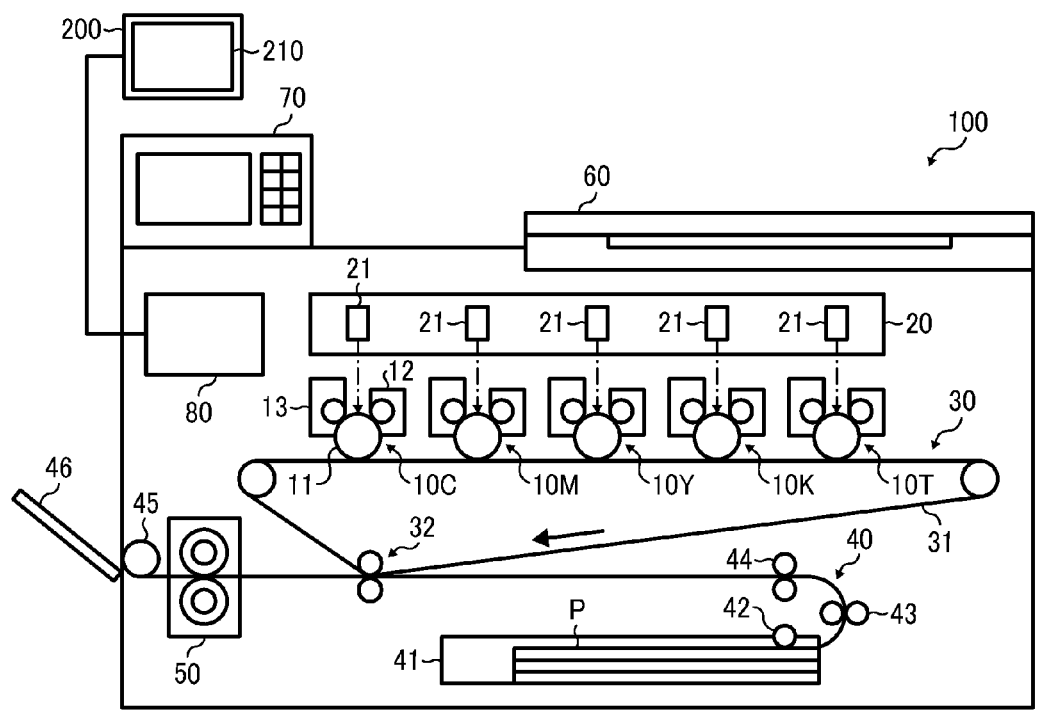
FIG. 1 shows a schematic configuration of an image forming apparatus according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to example embodiments such as first, second, and third example embodiments are described hereinafter.

FIG. 1 shows a configuration of an image forming apparatus according to a first example embodiment. An image forming apparatus 100 shown in FIG. 1 may be a tandem-type image forming apparatus that can form color images on recording sheets using one or more colored-toners and a clear toner such as four color toners and one clear toner.

The image forming apparatus 100 includes image forming units 10C, 10M, 10Y, 10K, and 10T arranged in a horizontal direction in the center of the image forming apparatus 100. The image forming units 10C, 10M, 10Y, 10K, and 10T employ the same configuration except toners. The image forming units 10C, 10M, 10Y, and 10K respectively use cyan (C), magenta (M), yellow (Y), and black (K) colored-toner to form toner images of cyan (C), magenta (M), yellow (Y), and black (K), and the image forming unit 10T uses clear toner (T) to form a transparent image. Although the transparent image formed by the clear toner (T) may not be observed as a visible image because of its transparency, for the sake of simplicity of expression, the formation of clear toner on a sheet or on other toner may be referred to as the formation of transparent image. In this disclosure, the explanation of common part of the image forming units 10C, 10M, 10Y, 10K, and 10T and other configurations may not be attached with reference characters of C, M, Y, K and T. For example, the image forming units 10C, 10M, 10Y, 10K, and 10T may be referred to as the image forming unit 10.

In general, the clear toner means colorless and transparent toner not including any coloring agent such as pigment or the like. In this disclosure, because the clear toner can be used to generate glossiness the clear toner may be used as glossy toner to create a lamé effect to images formed on sheets. Such clear toner may not be required to be completely colorless and transparent, which means the clear toner may include color component. Specifically, toner having the light transmission (Tt) of 30% or more can be used as the clear toner. The light transmission (Tt) can be measured by the test method specified in a standard such as Japan Industrial Standard (JIS) K7361-1 or International Organization for Standardization (ISO) 13468-1, in which prepared toner samples are irradiated by visible light emitted from a light source such as a halogen lamp.

The image forming apparatus 100 may include an optical writing unit 20 over the image forming unit 10, a transfer belt unit 30, a sheet feed unit 40, and a fusing unit 50 under the image forming unit 10. The image forming apparatus 100 may include a scanner 60 and a control panel unit 70 at the top of the image forming apparatus 100.

The image forming apparatus 100 may include a controller 80 that controls the image forming apparatus 100, image information processing, or the like. The controller 80 may be connected to an external apparatus 200 such as a personal computer, a facsimile machine, or the like. The external apparatus 200 includes an operation/display unit 210, by which a user can input commands to the external apparatus 200, and status of the external apparatus 200 can be displayed and reported to the user. As such, the operation/display unit 210 can be used as an information input unit when to input information to the image forming apparatus 100.

Each image forming unit 10 includes electrophotography processing units such as a photosensitive drum 11 used as an image carrying member, an exposing lamp, a charger 12, a development unit 13, a transfer unit, and a cleaning unit. The development unit 13 may store two-component developer including toner and magnetic carrier particles used by the image forming unit 10. The image forming apparatus 100 may include a toner supply unit such as a toner cartridge for each image forming unit 10. The toner supply unit supplies toner to the development unit 13 to maintain the toner concentration in the developer at a given range in the development unit 13.

The optical writing unit 20 may include five laser scanning units 21. Each laser scanning unit 21 conducts a laser beam scanning on the corresponding photosensitive drum 11 of image forming unit 10. The laser scanning unit 21 modulates the laser beam emitted from the light source in view of image forming signal used for each image forming unit 10. The modulated laser beam is reflected by a rotation of polygon mirror, and passes optical elements such as a f-theta lens and a reflection mirror, and then irradiates the photosensitive drum 11 as a scanning light.

The transfer belt unit 30 includes a transfer belt 31, which is an extended loop belt. The upper part of transfer belt 31 may contact the image forming units 10C, 10M, 10Y, 10K, and 10T, and the lower part of transfer belt 31 may contact a part of the sheet feed unit 40. A transfer position is set by the lower end of the photosensitive drum 11 and the transfer belt 31 that may contact with each other. The transfer belt 31 may move in a direction shown by an arrow while synchronized with each photosensitive drum 11 of each image forming unit 10. Each toner image formed on each photosensitive drum 11 is transferred at the transfer position from each photosensitive drum 11 to the transfer belt 31 sequentially using a transfer unit 32 such as a transfer roller. Each toner image can be transferred on or over the most-recent-transferred toner image one to another, by which a full-color toner image can be formed on the transfer belt 31.

The full-color toner image transferred on the transfer belt 31 is transferred to a recording sheet P, transported by the sheet feed unit 40, using the transfer unit 32, by which the full-color toner image is formed on the recording sheet P. The sheet feed unit 40 may include a separation roller 42, a feed roller 43, a registration roller 44, an ejection roller 45, and other transport roller. The recording sheet P is fed from the sheet cassette 41 to the transfer unit 32 and a fusing unit 50, and then transported to an ejection tray 46.

The fusing unit 50 may include a heat roller and a pressure member to fuse toner images on the recording sheet P. When the recording sheet P passes the fusing unit 50, the fusing unit 50 applies heat and pressure to the recording sheet P to fuse the toner images on the recording sheet P. The recording sheet P that has passed the fusing unit 50 is ejected to the ejection tray 46 by the ejection roller 45.

The scanner 60 optically scans document to capture color information such as red (R), green (G), and blue (B) to output digital image information of red (R), green (G), and blue (B). The control panel unit 70 includes a display panel to display operation keys used by a user when to input information of image forming operation or the like, and to display contents input by the user operation and information of setting conditions and operation status of apparatus. As such, the control panel unit 70 can be used as an information input unit when to input information to the image forming apparatus 100.

Figure 2:
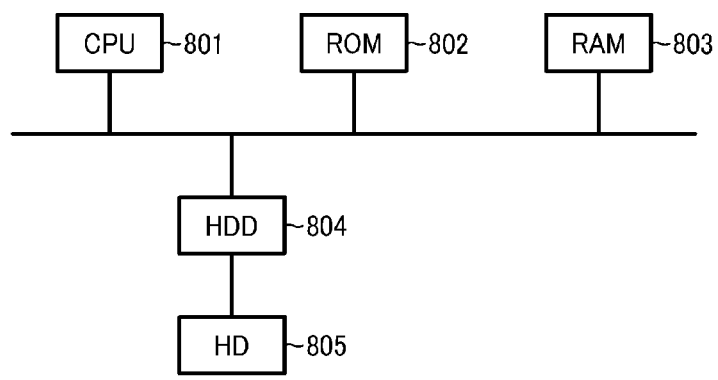
FIG. 2 shows a schematic hardware configuration of a controller according to the first example embodiment.

FIG. 2 shows a hardware configuration of the controller 80. The controller 80 may include a central processing unit (CPU) 801, a read only memory (ROM) 802, a random access memory (RAM) 803, a hard disk drive (HDD) 804, a hard disk (HD) 805, and a bus line 806. The ROM 802 stores various programs such as control programs and image processing programs of the image forming apparatus 100. The CPU 801 executes such programs to implement given processing. The RAM 803 is used as a working memory area when the CPU 801 executes programs. The HDD 804 is a HD drive, and the HD 805 is a storage to store data. The bus line 806 can be used to connect each unit with each other.

Figure 3:
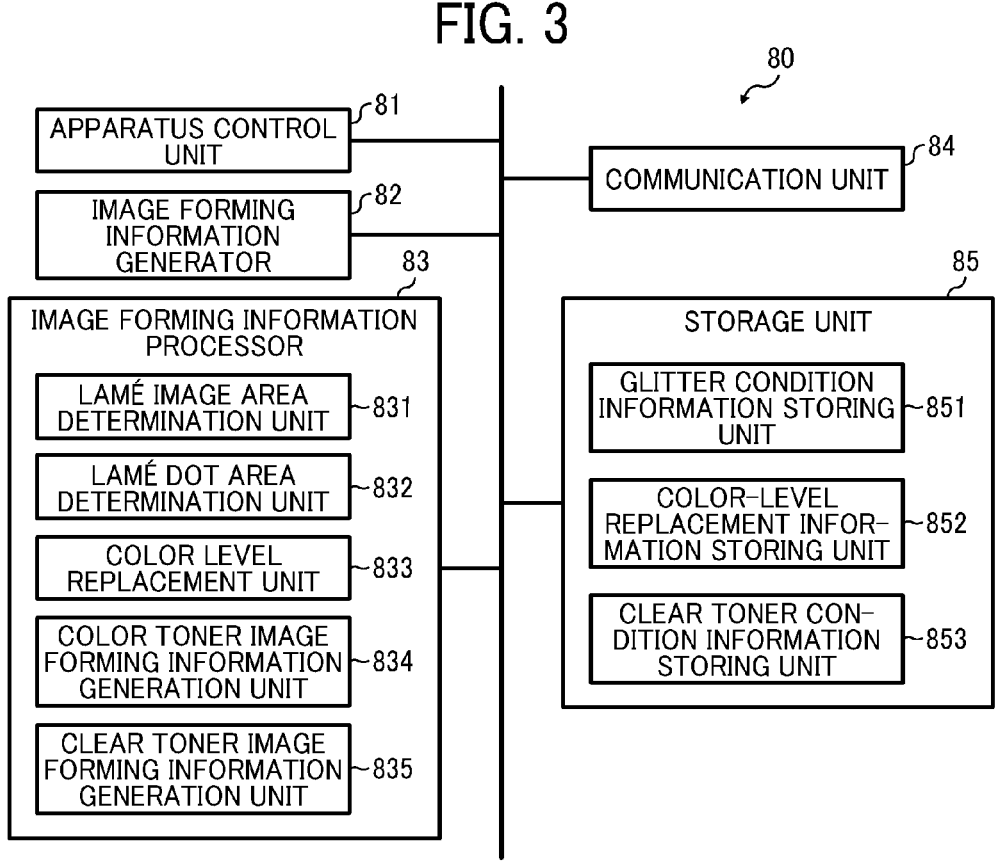
FIG. 3 shows a functional configuration of the controller of FIG. 2.

FIG. 3 shows a functional block diagram of the controller 80. The controller 80 may be configured with an apparatus control unit 81, an image forming information generator 82, an image forming information processor 83, a communication unit 84, and a storage unit 85.

The apparatus control unit 81 controls and operates the image forming apparatus 100 as a whole using programs and data. The image forming information generator 82 converts RGB digital image information, input from the scanner 60 or the external apparatus 200, to CMYK image forming information usable by the image forming apparatus 100 that forms images. The image forming information processor 83 conducts a process to form a lamé image for the image forming information converted by the image forming information generator 82, and generates image forming information to form the lamé image. The communication unit 84 is used to communicate with the external apparatus 200. The storage unit 85 is configured in the HD 805 to store information used for various processing.

The image forming information processor 83 may include a lamé image area determination unit 831, a lamé dot area determination unit 832, a color level replacement unit 833, a color toner image forming information generation unit 834, and a clear toner image forming information generation unit 835.

The lamé image area determination unit 831 (or a first area determination unit) determines a processing area for forming a lamé image in CMYK image forming information, wherein such processing area may receive an image processing and can be prepared as a lamé image area. The lamé dot area determination unit 832 (or a second area determination unit) determines a lamé dot area that can create a lamé effect, to be formed in the lamé image area determined by the lamé image area determination unit 831. The lamé dot area may be referred to a specific area.

The C, M, Y, K image forming information may be applied at the lamé dot area, as required. Specifically, toner image using colored-toner such as C, M, Y, K toner image may or may not be formed, and the color level may or may not be replaced at the lamé dot area, as required.

Figure 4:
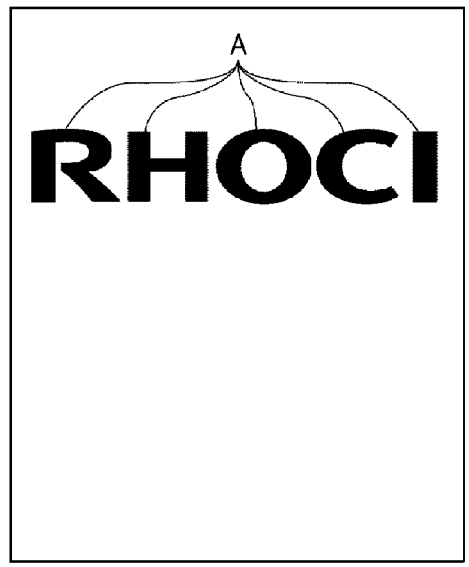
FIG. 4 shows an example of a lamé image.
Figure 5:
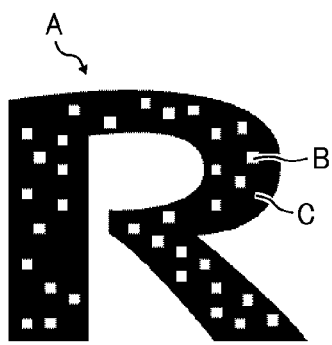
FIG. 5 is a partially expanded view of the image of FIG. 4.

FIGS. 4 and 5 show an example of an image having a lamé image, in which a substantially solid part of characters, texts, objects, or the like may be used as a lamé image area A (see FIG. 5) or solid image portion A. FIG. 5 shows an enlarged view of one character of FIG. 4, in which the lamé image area A includes a plurality of lamé dot areas B arranged with a pattern. As shown in FIG. 5, the lamé image area A includes the lamé dot area B and non-lamé dot area C, wherein the non-lamé dot area C is not used as the lamé dot area.

The color level replacement unit 833, used as a color level replacing or changing unit, can change the color level of C, M, Y, K image forming information in the lamé dot area by replacing information of color level in the image forming information. With such color level replacement, a given image property can be set for an image that is to be formed in the lamé dot area, and a difference between the image property of image formed at the lamé dot area B, and the image property of image formed at the non-lamé dot area C can be set with a given value, wherein the image property of image may be also referred to as the optical property of the formed image. Such optical property of image may be glossiness level of image, to be described later. As shown in FIG. 5, the lamé dot area B and the non-lamé dot area C in the lamé image area A are mutually exclusive areas with each other.

The color toner image forming information generation unit 834 generates colored-toner image forming information to form toner images of each of C, M, Y, K based on C, M, Y, K image forming information, which has a color level that is changeable by the color level replacement unit 833. Further, the clear toner image forming information generation unit 835 generates clear-toner image forming information based on image forming information of the lamé dot area, wherein clear-toner image forming information may be also referred to as glossy toner image forming information. These will be explained later.

The storage unit 85 stores a lookup table. The image forming information generator 82 refers to the information stored in the lookup table when to convert RGB-formatted image information to YMCK-formatted image forming information composed of Y, M, C, K information. For the simplicity of expression, the RGB-formatted image information may be referred to as RGB image information, and YMCK-formatted image forming information may be referred to as YMCK image forming information in this disclosure. Further, the storage unit 85 may include a lamé condition information storing unit 851, a color-level replacement information storing unit 852, and a clear toner condition information storing unit 853.

The lamé condition information storing unit 851 stores information to be used by the image forming information processor 83 when to form lamé images under given conditions. The color-level replacement information storing unit 852 stores color-level information to be used for a replacement of color-level by the color level replacement unit 833.

The clear toner condition information storing unit 853 stores information of process conditions such as line number, dot area ratio or the like to be used by the clear toner image forming information generation unit 835 when to form a clear image. The line number or screen line number is expressed by the numbers of line per inch (lpi) indicating the numbers of dot or screen line per inch. Typically, the line numbers of 160-212 lpi may be used for electrophotography. The smaller the line numbers, the more roughness of image is observed. Further, the dot area ratio means a toner-adhering area ratio per unit area. When the dot area ratio of image is 100%, the image becomes a solid image. The unit area used for the dot area ratio may be a unit of dither matrix, but not limited thereto.

Figure 6:
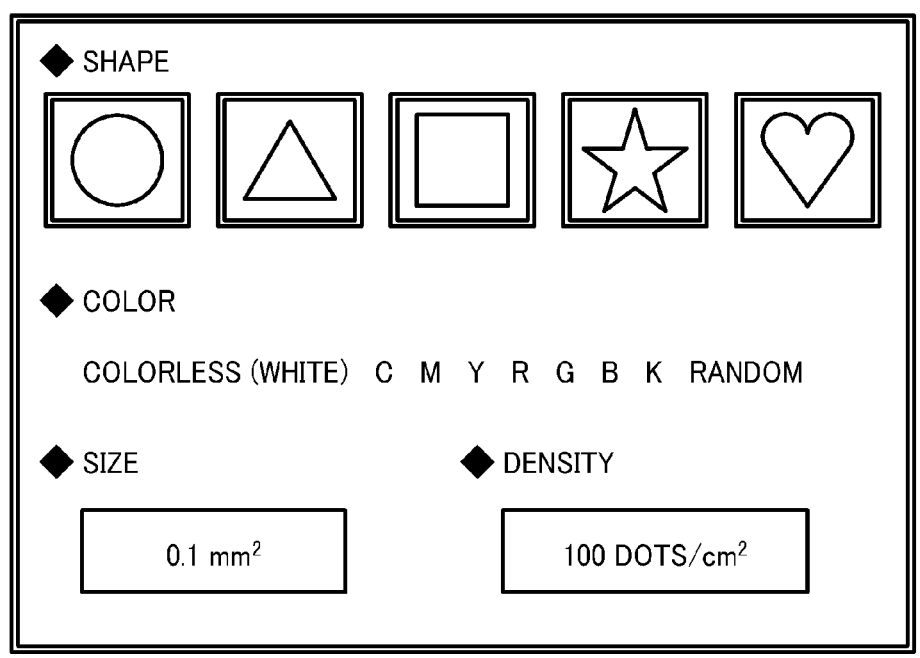
FIG. 6 shows an input screen to input lamé condition information.

FIG. 6 shows an input screen to input lamé condition information such as conditions of lamé image using the operation/display unit 210 of the external apparatus 200 or the control panel unit 70 of the image forming apparatus 100. The input screen or operation screen of FIG. 6 displays selection items such as "shape" and "color" of lamé dot area, and numerical value input sections to input "size (area)" and "density" of lamé dot area such as numbers of lamé dot area per unit area. As such, the operation/display unit 210 of the external apparatus 200 or the control panel unit 70 of the image forming apparatus 100 can be used as a shape designation unit to designate the shape of lamé dot area. A user can select the shape and color of lamé dot area from a list of shape patterns and a list of colors of lamé dot area displayed on the input screen, and can input numerical values for the size and density of lamé dot area. The selected or input information can be stored in the lamé condition information storing unit 851 of the storage unit 85.

The image forming information processor 83 can be separated from the image forming apparatus 100 and configured as an image forming information processing apparatus.

A description is given of an image forming operation of the image forming apparatus 100 using C, M, Y, K color without clear toner, in which image information may be transmitted from the external apparatus 200 such as a personal computer to the image forming apparatus 100. The image forming apparatus 100 can function as a printer, and RGB-formatted image information is transmitted from the external apparatus 200, and input to the image forming information generator 82 via the communication unit 84 of the controller 80, and then the apparatus control unit 81 controls following operations.

Upon inputting the image information to the image forming information generator 82, each unit of the image forming apparatus 100 is activated to conduct an image forming operation with a given timing controllable by the apparatus control unit 81. For example, the driving of the photosensitive drum 11 of each image forming unit 10, the rotation of a polygon mirror of the optical writing unit 20, the rotation of the transfer belt 31, and the feed of the recording sheet P from the sheet cassette 41 of the sheet feed unit 40 can be started at given timing. The image information of R, G, B input to the image forming information generator 82 can be converted to image forming information of C, M, Y, K process-able by the image forming information generator 82 in the image forming apparatus 100.

In the sheet feed unit 40, the separation roller 42 of the sheet cassette 41 is driven to separate the recording sheet P stored in the sheet cassette 41 one by one, and transported to the registration roller 44 by the feed roller 43. Then, the recording sheet P is fed to the transfer unit 32 by the registration roller 44 at a given control timing.

As for the image forming unit 10, the photosensitive drum 11 rotates in the counter-clockwise direction at a given control timing, and the charger 12 uniformly charges the surface of the photosensitive drum 11 at a given potential with a given polarity. The optical writing unit 20 irradiates a laser beam, corresponding to image forming signal, to the surface of each photosensitive drum 11, by which an electrostatic latent image corresponding the image forming signal is formed on the photosensitive drum 11. The electrostatic latent image formed on the photosensitive drum 11 of the image forming unit 10 is developed as a toner image by the development unit 13. Such process is conducted for each of C, M, Y, and K. As such, C, M, Y, and K toner images can be formed on the photosensitive drum 11 of each of the image forming units 10C, 10M, 10Y, and 10K. Because image forming information of T toner (i.e., clear toner) is not included, a clear toner image is not formed on the photosensitive drum 11 of the image forming unit 10T.

The transfer belt 31 of the transfer belt unit 30 travels in a direction shown by an arrow in FIG. 1. The toner image formed on each photosensitive drum 11 is sequentially transferred on the transfer belt 31 at a transfer position where the each photosensitive drum 11 contacts the transfer belt 31 with an effect of a transfer unit such as a transfer roller so that a full-color toner image is formed on the transfer belt 31. The full-color toner image formed on the transfer belt 31 is transferred onto the recording sheet P, fed by the registration roller 44 of the sheet feed unit 40, at the transfer unit 32. The recording sheet P is then fed to the fusing unit 50 by the sheet feed unit 40, and the toner image is fused on the recording sheet P by applying heat and pressure at the fusing unit 50. Then, the recording sheet P is transported by the ejection roller 45 and ejected to the ejection tray 46. The image forming operation using C, M, Y, K color is conducted as such.

A description is given of an image forming operation using clear toner. Based on clear toner image forming information, a toner image of clear toner is formed on the photosensitive drum 11 of the image forming unit 10T, wherein the clear toner image itself may be a transparent image. The clear toner image is superimposed on the transfer belt 31 as similar to other color toner images, and the toner images of each color toner and clear toner formed on the transfer belt 31 can be transferred on the recording sheet P. Specifically, the clear toner image is at a bottom layer of toner images formed on the transfer belt 31, and thereby the clear toner image becomes a top layer of toner images when the toner images are transferred on the recording sheet P.

When a clear toner image is formed on a part of or an entire face of image or sheet, an instruction to form the clear toner image is input to the apparatus control unit 81 via the communication unit 84 with the image information such as RGB image information from the external apparatus 200. Then, the apparatus control unit 81 instructs the image forming information generator 82 to form the clear toner T, and then the image forming information generator 82 generates the image forming information for clear toner T, wherein image forming information for clear toner T may be referred to as the clear toner image forming information or the glossy toner image forming information.

Further, image information can be input to the image forming apparatus 100 using the scanner 60. Specifically, when a signal to start an image-forming operation is input to the image forming apparatus 100 via the control panel unit 70, such input signal is input to the controller 80, and then the scanner 60 starts to scan document to scan images, and then the image forming apparatus 100 starts its operation under the control of the apparatus control unit 81 as similar to the above case. Image information of R, G, B scanned by the scanner 60 is converted to image forming information of C, M, Y, K at the image forming information generator 82.

A description is given of a process of forming a lamé image. Upon receiving signals of RGB-formatted image information from the external apparatus 200, the image forming information generator 82 converts such signals to image forming information process-able by the image forming apparatus 100. Such image forming information process-able by the image forming apparatus 100 corresponds to toner image forming information of Y, M, C, and K, which may be used by the image forming apparatus 100 for forming images.

In an example embodiment, the RGB-formatted image information input to the image forming information generator 82 includes image information of R, G, B and information of lamé image area designated as a process area for forming a glitter-causing image.

The lamé image area can be, for example, designated by a user's operation to the operation/display unit 210 of the external apparatus 200 when the external apparatus 200 generates the RGB-formatted image information. For example, in the image information, the lamé image area may be labeled as "1," and other area not used for the lamé image area may be labeled as "0." Such labeling information can be used to designate the lamé image area. As such, the image information input to the image forming information generator 82 may include image information of R, G, B, and labeling information indicating the lamé image area or other area not used for the lamé image area.

Figures 7, 8:
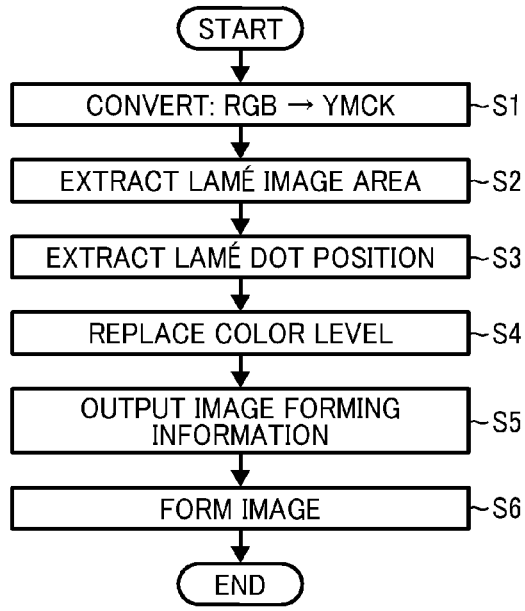
FIG. 7 shows a flowchart of processes executed by an image forming information generator and an image forming information processor.
FIG. 8 shows an example of a color level replacement table.

FIG. 7 shows a flowchart of process executable by the image forming information generator 82 and the image forming information processor 83. When RGB image information is input to the image forming information generator 82 via the communication unit 84, the image forming information generator 82 conducts a color conversion process that converts the color space of image information from RGB to YMCK (step S1). Specifically, in such color conversion process, the image forming information generator 82 applies information included in the lookup table stored in the storage unit 85 to the RGB-formatted image information to compute three color components of Y, M, and C, and then conducts the under color removal (UCR) process to compute K component. By conducting the color conversion process using the image forming information generator 82, the RGB image information is converted to YMCK image forming information composed of Y, M, C, and K components. The YMCK image forming information includes a grayscale value set for each color of Y, M, C, and K, which may composes an image.

Then, the lamé image area determination unit 831 of the image forming information processor 83 refers to the labeling information indicating the lamé image area, included in the RGB-formatted image information, to extract the image forming information corresponding to lamé image area from YMCK image forming information (step S2).

Then, the lamé dot area determination unit 832 of the image forming information processor 83 randomly sets at least two or more lamé dot positions in the lamé image area. Based on the image forming information for the lamé image area extracted by the lamé image area determination unit 831, the lamé dot area determination unit 832 extracts image forming signals corresponding to the lamé dot positions (step S3).

The lamé dot area corresponds to an area that glitter-effect causing particles are formed by the printing operation. Typically, the more the lamé dot areas, and the more random setting of lamé dot areas, the more glittering effect (e.g., increased glaring and shining) occurs. The lamé dot area determination unit 832 sets the lamé dot areas based on the lamé condition information stored in the lamé condition information storing unit 851 of the storage unit 85. For example, the lamé dot area determination unit 832 randomly sets lamé dot positions based on information of the density of lamé image area, determines and sets the lamé dot area based on information of the shape and size of the lamé dot areas, and extracts image forming information of Y, M, C, K corresponding to the lamé dot area from the YMCK image forming information.

The color level replacement unit 833 can replace color level of image forming information corresponding to the lamé dot area to a given color level, which can be set in advance (step S4). The color level replacement unit 833 can replace color level of concerned color by selecting the color type from information stored in the lamé condition information storing unit 851, and by applying the color-level replacement information of concerned color stored in the color-level replacement information storing unit 85.

FIG. 8 shows an example of a color level replacement table store-able in the color-level replacement information storing unit 852. The color level replacement table stores color level information, which may be designated by grayscale values of image forming information of Y, M, C, and K, which can be set in advance. Based on such table, a user can select the color level for the lamé dot area. For example, the grayscale values for YMCK image forming information can be set in a range from 0 to 100% for each of Y, M, C, and K.

In this disclosure, the grayscale value can be corresponded to the dot area ratio for the output images, in which toner images are adhered on a recording sheet based on the value of dot area ratio. The grayscale value can be input as a signal having a range of 0-100%. For example, when an image is formed using, for example, K color, the image is formed differently depending on the grayscale value. When the grayscale value of K color is 0%, the color becomes white (i.e., surface color of sheet), and when the grayscale value of K color is 100%, the color becomes solid black. Therefore, when the dot area ratio of K color is 0%, the color becomes white (i.e., surface color of sheet) and, when the dot area ratio of K color is 100%, the color becomes solid black. Therefore, the greater the grayscale value of each of Y, M, C, and K, the greater the adhered toner amount, and the more dark of the color.

In the table shown in FIG. 8, the color level replacement table sets grayscale values for colorless and blue (B), and omits grayscale values for other color for the simplicity of drawing. In the table shown in FIG. 8, colorless means that no color images are formed, and thereby the surface of a recording sheet such as paper can be seen. Because white paper may be typically used as the recording sheet, the colorless may mean white, but not limited to white.

In the first example embodiment, colorless (or white) may be selected as the color of lamé dot area, and the color level replacement table sets "0%" for each of Y, M, C, and K color in the colorless section as shown in FIG. 8. In such a case, the color level replacement unit 833 replaces the grayscale value of image forming information of Y, M, C, and K existing in each lamé dot area to 0%, by which colored-toner does not adhere to the lamé dot area.

Conventionally, silver-colored lamé particles may be used for a special printing so that light reflected from images can be seen as white-like lamé light. In this disclosure, such white light glittering effect can be devised using the above described processing such as not-adhering the colored-toner on the lamé dot area, by which the glittering effect can be seen, for example, as white light or silver light. The grayscale values set for the color level replacement table may not limited to 0%, and can be set other values in view of given conditions set for each color.

As such, the color level replacement unit 833 can replace the color level such as grayscale values of each of Y, M, C, and K. Based on the image forming information having the changed grayscale values, the color toner image forming information generation unit 834 generates and outputs colored-toner image forming information of each of Y, M, C, and K (step S5).

Because the grayscale values of image forming information corresponding to each lamé dot area are replaced to 0%, the grayscale value of image forming information of Y, M, C, and K corresponding to each of lamé dot areas are replaced to 0%. Therefore, the colored-toner image forming information corresponding to each lamé dot area indicates that colored-toner does not adhere to the lamé dot area. Because colored-toner does not adhere to each of lamé dot areas, the colored-toner image is not formed on the lamé dot area.

Further, at step S5, the clear toner image forming information generation unit 835 also generates and outputs a clear toner image forming information (or glossy toner image forming information) in view of image forming information corresponding to each lamé dot area.

The clear toner image forming information generation unit 835 converts the color level of image forming information corresponding to each lamé dot area to a grayscale value indicating the amount of clear toner so that the clear toner image forming information generation unit 835 generates and outputs the clear toner image forming information (or glossy toner image forming information). Based on such clear toner image forming information, the clear toner is to adhere on each of lamé dot areas to form the clear toner image.

Upon receiving the colored-toner image forming information of Y, M, C, and K, and the clear toner image forming information, the image forming unit 10 can form colored-toner images and a clear toner image based on such received image forming information. The colored-toner images and clear toner image are superimposed on the transfer belt 31, and then transferred to the recording sheet P, in which a color image may be formed on the recording sheet P by superimposing the clear toner image at the top layer of a toner image formed on the recording sheet P (step S6).

In the first example embodiment, because the grayscale value of image forming information corresponding to each lamé dot area is all replaced to 0%, the colored-toner does not adhere on each lamé dot area, but the clear toner adheres on each lamé dot area. With such configuration, the lamé dot area can create a silver-like glittering effect that emits white-like reflection having a given glossiness level.

The clear toner, adhere-able to the lamé dot area, may preferably be resin material or resin-based material having high glossiness property compared to other colored-toners because the glittering effect such as glaring and shining can be increased if the glossiness difference between the lamé dot area and non-lamé dot area becomes great. The lamé effect can be caused when a given glossiness difference is set between the lamé dot area (i.e., specific area) and non-lamé dot area (i.e., non-specific area) by setting given glossiness levels for the lamé dot area and the non-lamé dot area. With such setting, the lamé image can be formed as above described. The grayscale values set in the color level replacement table may be 0% as above described, but other values satisfying given conditions can be set for each color. The glossiness level of image may be one example of optical property of formed image.

As such, the lamé effect can be caused by setting a given glossiness level for lamé dot area, and the glossiness difference between the lamé dot area (i.e., specific area) and non-lamé dot area (i.e., non-specific area). Such glossiness setting and glossiness difference can be determined by conducting subjective evaluation tests. Based on the result of subjective evaluation tests, the grayscale value of image forming information can be changed and set in the color level replacement table as grayscale values to be used for the color level replacement process. The inventors prepared samples by changing the glossiness level of lamé dot areas, the glossiness level of non-lamé dot areas, and the size of lamé dot area to conduct subjective evaluation tests. The tests and results will be explained later.

A description is given of a process of randomly designating lamé dot positions in the lamé image area, a process of setting the lamé dot areas based on the lamé dot positions, and color level replacement process, which may be conducted in step S3 and step S4 of FIG. 7.

For example, the following conditions may be used. Image forming information input to an apparatus is 600 dpi (dot per inch) data having one pixel size of $0.042 \times 0.042$ mm$^2$ The lamé image conditions of lamé image area may be set to the density of lamé dot as 100 dots/cm$^2$, the size of each lamé dot area as 0.1 mm$^2$, the shape of lamé dot area as square, and the color of lamé dot area as colorless.

Further, lamé sheet information having a unit area of $10 \times 10$ mm$^2$=$1 \times 1$ cm$^2$ ($238 \times 238$ pixel) is prepared, wherein the unit area of lamé sheet information corresponds to a unit area for setting lamé dot positions. The lamé sheet information, used for setting lamé dot areas, is a digitized signal pattern having a given size such as $238 \times 238$ pixels. Such lamé image conditions can be input through the input screen shown in FIG. 6. Further, the unit area of lamé sheet information and the corresponding unit area for setting lamé dot positions can be set and stored in the lamé condition information storing unit 851.

Information of the lamé image conditions such as lamé dot density of 100 dots/cm$^2$, and lamé dot size of 0.1 mm$^2$ can be stored in the lamé condition information storing unit 851. Such information is transmitted to the lamé dot area determination unit 832 of the image forming information processor 83. Based on such information of lamé image conditions, the lamé dot area determination unit 832 prepares the lamé sheet information, in which a lamé dot pattern per unit area may be defined, at first, to determine positions that lamé dots are to be formed, and then the lamé image area is set. The unit area used for setting the positions of lamé dots may be redefined as lamé sheet information. Therefore, the lamé sheet can be used as a sheet having a given unit area, which may correspond to pixels included in image forming information. The lamé sheet information can be prepared by writing image forming information having the replaced value of color level to such lamé sheet by using the color level replacement unit 833.

In the first example embodiment, the lamé dot area is set in the lamé sheet, and the image forming information of replacing the color level of image forming information is written to the lamé dot area. Such lamé sheet information is overwritten to the YMCK image forming information converted by the image forming information generator 82 to conduct a color level replacement of the image forming information. The lamé sheet can be prepared based on information of density of lamé dots and information of size of lamé dot area. In the first example embodiment, the minimum unit area of lamé sheet of 10×10 mm² (238×238 pixels) is used, but the minimum unit area of lamé sheet is not limited thereto.

A description is given of preparing the lamé sheet. The lamé sheet may have the unit area of 10×10 mm²=1×1 cm² (238×238 pixels) which is used to set positions of lamé dots. Based on information of the density of lamé dots of 100 dots/cm², 100 lamé dot areas are arranged within the unit area of the lamé sheet, in which each of lamé dot positions is first, and each of the lamé dot areas is arranged by corresponding to each of the lamé dot positions.

Figure 9:
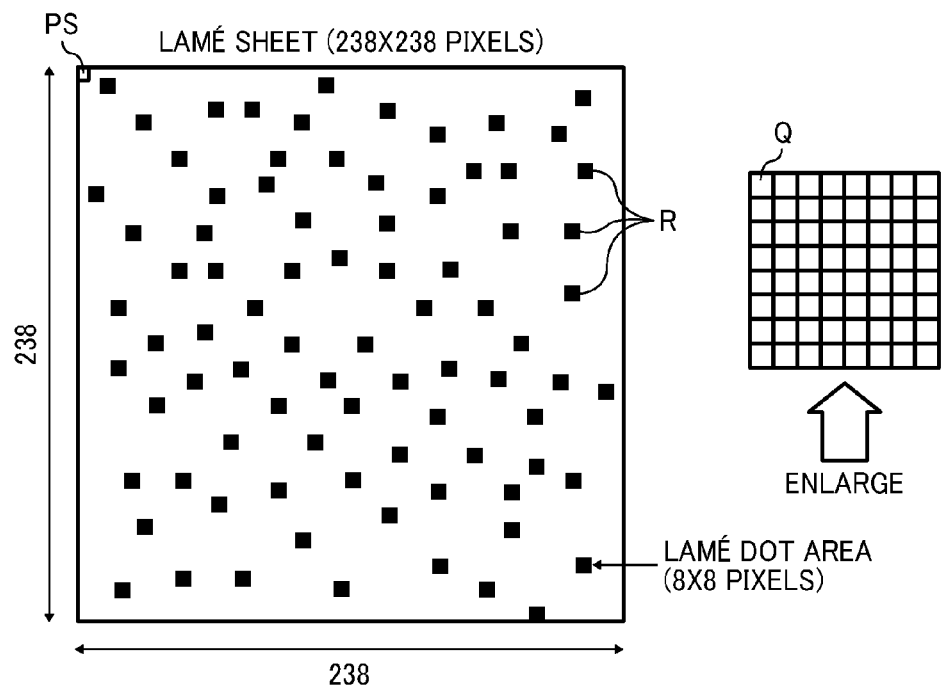
FIG. 9 shows an example of a lamé sheet and a lamé dot area.

FIG. 9 shows a lamé sheet and lamé dot area. In such lamé sheet, the position of any one of pixels of 238×238 pixels can be set as a lamé dot position. Specifically, each lamé dot position can be designated and set by generating random numbers from 0 to 229. The random numbers are set in the range of 0 to 229, but not 0 to 238.

As shown in FIG. 9, the lamé sheet (or lamé pattern) has 238×238 pixels, and the lamé dot area has a square shape of 8×8 pixels. The position of each lamé dot area can be defined using the top-left pixel Q of the lamé dot area as a base point. For example, if the lamé dot area is (x, y)=(0, 0) of 238×238 pixels, the lamé dot area becomes (x, y)=(0-7, 0-7) because lamé dot area has 8×8 pixels. If the lamé dot area is (x, y)=(234, 234) of 238×238 pixels, the lamé dot area becomes (x, y)=(234-241, 234-241) because the lamé dot area has 8×8 pixels, in which the lamé dot area deviates from the size of the lamé sheet. To prevent such deviation, the position of lamé dot is defined in (x, y)=(0-229, 0-229) using random numbers from 0 to 229. As such, the range of random numbers may be changed depending on the size of lamé dot area.

Each of lamé dot position is set on the lamé sheet, wherein the upper left corner of the lamé sheet is set as a base position "PS," the horizontal pixel position is defined as "X," and the vertical pixel position is defined as "Y." Specifically, random numbers are generated for 100 times for "X" and 100 times for "Y" to determine coordinates of 100 lamé dots. The lamé dot area is arranged in the lamé sheet by matching the upper left corner coordinate Q of each lamé dot area, and lamé dot position defined by generated random numbers. FIG. 9 shows an example arrangement of lamé dot areas "R" in the lamé sheet arranged with the above method.

As such, the lamé dot area is arranged in the lamé sheet. Then, by using the color level replacement unit 833, the image forming information having replaced with the color level is written to the lamé sheet. In the first example embodiment, because the color of lamé dot area is set colorless, the color level replacement table, stored in the color-level replacement information storing unit 85 of the storage unit 85, stores the grayscale values of 0% for each of Y, M, C, and K, which are set when colorless is set to the lamé dot area. Therefore, 0% is written as the grayscale value to all pixels within the lamé dot area in the lamé sheet.

Further, pixels in the lamé sheet information not used as the lamé dot area may be set "blank (no information)." Specifically, the color level of such pixels not used as the lamé dot area is processed as blank (no information). Such pixels having set the blank (no information), not used as the lamé dot area, may be stored in the lamé condition information storing unit 851 of the storage unit 85, which is separately stored from the color level replacement table. Therefore, the grayscale value of "blank" is set for all pixels in the area not used as the lamé dot area. When the blank is set, no specific process is conducted.

With such a configuration, when the lamé sheet information is written over the image forming information converted by the image forming information generator 82, color information of image forming information set for the area, not used as the lamé dot area, can be retained because "blank" information is set for such area. With such processing, one unit of lamé sheet written with image forming information having the replaced value of the color level can be prepared.

Then, by using the lamé sheet, a laminate sheet to be written over the image forming information of each Y, M, C, K color can be prepared. The laminate sheet may mean digitized data pattern registered with the lamé dot positions. The laminate sheet may have the same size of the image size, in which the lamé dot area is arranged only to the lamé image area, and the grayscale value of 0% is written to all pixels in the lamé dot area.

Figure 10:
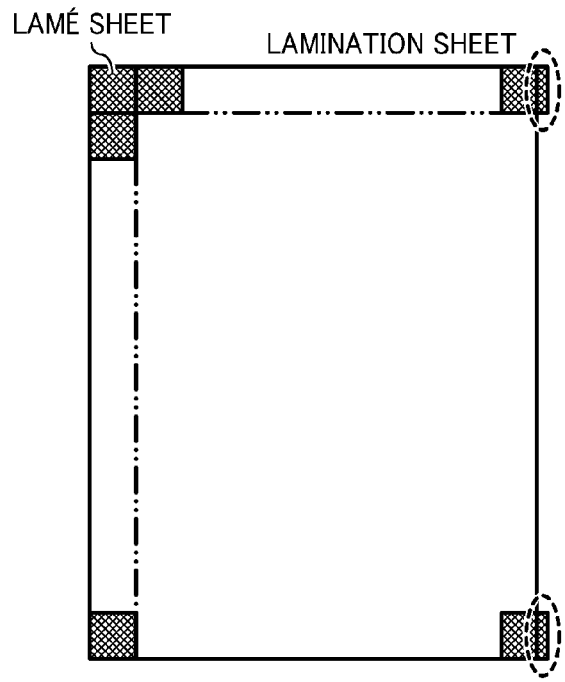
FIG. 10 shows an example of how to prepare a laminate sheet.

A description is given of preparation of the laminate sheet. At first, one unit of the lamé sheet, prepared as above, is duplicated for a plurality of numbers, and such lamé sheets are arranged and connected with each other to form a sheet size corresponding to the image size as shown in FIG. 10. When the image size is A4, the laminate sheet of A4 size is prepared by connecting the lamé sheets. A portion of lamé sheet, which deviates outside the image size (see dot line in FIG. 10), is cut. With such processing, the laminate sheet having the same size of the image and arranging the lamé dot areas on the entire area can be prepared.

Then, based on the labeling information indicating the lamé image area, input with the RGB image information to the image forming information generator 82 from the external apparatus 200, pixels in the laminate sheet, not existing in the lamé image area are all set to "blank (no information)." As similar to the pixels in the above described lamé sheet, pixels in the laminate sheet, not existing in the lamé image area, are set with the grayscale value of "blank".

With such processing, a processing-completed laminate sheet having the same size of the image size and arranging the lamé dot areas only to the lamé image area can be prepared. Such laminate sheet is written over the image forming information of Y, M, C, K color, converted by the image forming information generator 82. With such processing, the color level of the image forming information can be replaced only for an area designated by a user, and such color-level-replaced image forming information can be obtained.

The process of randomly designating lamé dot positions in lamé image area, and the process of setting lamé dot area based on the lamé dot position, and the color level replacement process can be conducted as above described in step S3 and step S4 of FIG. 7. A description is given of subjective evaluation tests and results using the above described example embodiment, in which test images were formed and evaluated.

(Test 1)

In test 1, Y, M, C, K toner for imagio MPC 7500 (manufactured by Ricoh Co. Ltd.) were used as colored-toner. The average diameter of toner particles was about 6 μm. The clear toner was prepared by changing some processes for manufacturing toner resin for imagio MPC 7500, and the average diameter of clear toner particles was about 6 μm. Further, the imagio MPC 7500 was modified partially to an image forming apparatus that can form images with five types of toners such as Y, M, C, K, T toner. Imagio is a registered trademark of Ricoh Co. Ltd. A4 size POD gloss coated paper (paper weight of 128 g/m²) and A4 size POD matt-coated paper (paper weight of 128 g/m$^2$) manufactured by Oji paper Co., Ltd. were used as the recording sheets.

In test 1, images shown in FIG. 5 were prepared, in which the lamé image area A such as letter image include images causing the lamé effect. FIG. 5 shows a partially enlarged image of letter image of FIG. 4. As shown in FIG. 5, a plurality of lamé dot areas B can be arranged in the solid image portion A. As for the lamé image area A of FIG. 5, the non-lamé dot area C, which is not the lamé dot area B, was prepared by setting the grayscale value of 100% for Y color, and 100% for M color.

When such toner image was fused on the above mentioned POD gloss coated paper, 60-degree glossiness level of the non-lamé-dot area C was about 30%. Further, when such toner image was fused on the above mentioned POD matt-coated paper, 60-degree glossiness level of the non-lamé-dot area C was about 7%. The conditions of sample preparation for test 1 were set by changing the glossiness level of lamé dot areas, the size of lamé dot area, and the numbers of lamé dot areas per unit area. Further, the shape of lamé dot area was set to square. Because the clear toner area adhered to the lamé dot area is too small compared to the size of aperture of a conventional glossiness level measurement device, the clear toner area was unable to be measured. Therefore, a patch to measure the glossiness level of lamé dot area was added on the same recording sheet, and then the glossiness level of lamé dot area was measured. Further, the clear toner was adhered at the lamé dot area as a solid image (i.e., without conducting the dot processing). The adhering amount of clear toner per unit area was set to 0.40 mg/cm$^2$.

The glossiness level was measured by using a standard of JIS-Z8741 specifying "specular glossiness; method of measurement." In the specular glossiness measurement method, the parallel light enters a sample object with a defined incidence angle θ, and a light receiver detects light reflected in the regular direction from the sample object, and the detected reflection light flux is normalized by the reflection light flux detected for the standard face (i.e., glass face having a refractive index of 1.567 for all visible frequency) under the same condition, and then determined as specular glossiness level.

In the specular glossiness measurement method, the incidence angle θ can be set to 20 degrees, 45 degrees, 60 degrees, 75 degrees, and 85 degrees. In general, the greater the specular glossiness level of sample object, the smaller incidence angle is preferably used for measurement, and the smaller the specular glossiness level of sample object, the greater incidence angle is used for measurement. In test 1, 60-degree glossiness level was used. The glossiness level measurement was conducted using GM-26D of Murakami Color Research Laboratory.

The subjective evaluation test was conducted for each sample by ten evaluation engineers, and the subjective evaluation point was set by applying following criteria.

point 4: image can be clearly seen as lamé image;
point 3: image can be seen as lamé image;
point 2: image can be seen as lamé image a little;
point 1: image cannot be seen as lamé image.

The evaluation points of ten evaluation engineers were averaged for each sample, and the averaged values were determined as the evaluation point.

(Test 1-1)

Samples were prepared by changing the size of lamé dot area (mm$^2$) and the lamé dot numbers per unit area (dot numbers/cm$^2$), and then subjective evaluation tests were conducted. The POD gloss coated paper manufactured by Oji paper Co., Ltd. was used as the recording sheets. The 60-degree glossiness level of solid image portion fused on the POD gloss coated paper was about 30%. Further, the 60-degree glossiness level of lamé dot area was 45%.

Figures 11, 12, 13:
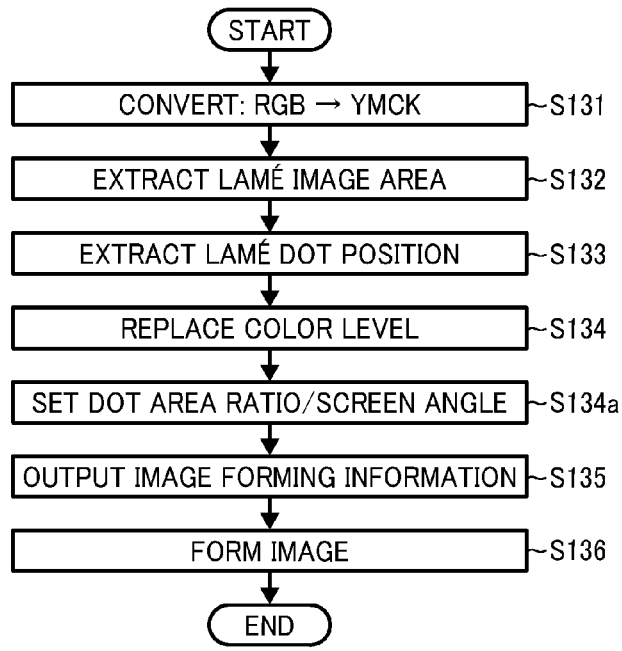
FIG. 11 shows subjective evaluation test results of test 1-1.
FIG. 12 shows subjective evaluation test results of test 1-2.
FIG. 13 shows a flowchart of processes executed by an image forming information generator and an image forming information processor according to a second example embodiment.

FIG. 11 shows the results of subjective evaluation tests of test 1-1. In view of fluctuation of the evaluation engineers, the median value of point 3 (seen as lamé image) and point 2 (seen as lamé image a little) was set as an allowable level, in which a user allows the image as lamé image if the average evaluation point was 2.5 or more. FIG. 11 shows the results of subjective evaluation tests using following average evaluation point as criteria.

point 1 to less than 1.5: x (not totally allowed)
point 1.5 to less than 2.5: Δ (not allowed)
point 2.5 to less than 3.5: ○ (allowed)
point 3.5 to less than 4: ⊚ (totally allowed)

Further, for example, when the size of lamé dot area is over 1 mm$^2$ or more, and/or lamé dot numbers per unit area is 100 (dot numbers/cm$^2$) or more, the lamé area is entirely filled with the lamé dots. Such samples were not prepared, and only "−" was set in the result as shown in FIG. 11. As shown in the results, when the size of lamé dot area is 1 mm$^2$ or less and lamé dot numbers per unit area is 50 (dot numbers/cm$^2$) or more, the results of "○ (allowed)" or "⊚ (totally allowed)" were obtained, and the images were seen as lamé image.

(Test 1-2)

In test 1-2, the size of lamé dot area was set to 0.49 (mm$^2$), and the lamé dot numbers per unit area was set to 50 (dot numbers/cm$^2$), and the subjective evaluation tests were conducted by changing the glossiness level of lamé dot area and the glossiness level of non-lamé dot area. The above mentioned POD gloss coated paper and POD matt-coated paper (128 g/m$^2$) were used as the recording sheets, and the non-lamé dot area was prepared by setting different glossiness level. Specifically, samples prepared by setting 60-degree glossiness level of non-lamé dot area to 30%, and samples prepared by setting 60-degree glossiness level of non-lamé dot area to 7% were compared. The clear toner was prepared by changing some processes for manufacturing toner resin for imagio MPC 7500, and further changing visco-elasticity, by which several types of clear toner having different glossiness level after the fusing were prepared and used. The sample images used for test 1-1 were also used.

FIG. 12 shows the results of subjective evaluation tests of test 1-2. Base on the results, it was found that the 60-degree glossiness level of lamé dot area is preferably set to a value greater than the glossiness level of solid image portion at least 10% or more. Further, it was found that the lamé dot area itself may be required to have a given glossiness level such as glossiness level of 20% or more. Based on the results of tests 1-1 and 1-2, the grayscale value set for the color level replacement table is preferably set to 0%, which is colorless. As above described, based on the results of tests 1-1 and 1-2, images having lamé effect can be formed using typical electrophotographic image forming apparatus and toner, without significant change of configuration of apparatus and toner.

Second Example Embodiment

In the above described first example embodiment, the clear toner was adhered as a solid image, which means the grayscale value of 100% was applied for the clear toner image, which becomes each lamé dot area. A description is given of second example embodiment to form images having enhanced lamé effect by adhering clear toner by randomly setting dot area ratio and screen angle. A description is given of image forming process based on random setting of dot area ratio and screen angle for clear toner.

FIG. 13 shows a flowchart of image forming process according to a second example embodiment, in which only a process related to the clear toner image forming information generation unit 835 is different from the process shown in FIG. 7, which may be conducted by the image forming information generator 82 and the image forming information processor 83. Other configurations and processes are same as the process shown in FIG. 7. In the flowchart of FIG. 13, steps S131 to step S134, and steps S135 to S136 are respectively same as steps S1 to S4, and steps S5 to S6 shown in FIG. 7.

In the process of FIG. 13, step S134 is followed by step S134*a*. At step S134*a*, the dot area ratio and screen angle are randomly set for clear toner to be adhered to each lamé dot area. With such random setting, the glossiness of each lamé dot area can be changed randomly among the lamé dot areas, and the glossiness can be changed when images are viewed from different angles, by which lamé effect such as glare and shining can be enhanced.

When lamé images are actually formed, the lamé effect can be observed when the lamé image areas are viewed from an angle because the lamé image areas include a glitter-particle area having glossiness and a glitter-particle area not having glossiness.

When toner particles adhere on a sheet, the greater the dot area ratio, and the smaller the roughness of toner surface after the fusing process, the greater the glossiness level. By using such property, lamé effect such as glare can be reproduced by setting the dot area ratio randomly for each lamé dot area. Therefore, the lamé effect can be devised by randomly setting the dot area ratio to the clear toner image forming information by using the clear toner image forming information generation unit 835. Information of lamé image condition to be used by the clear toner image forming information generation unit 835 such as settings of line numbers, settings of dot area ratio, or the like can be stored in the clear toner condition information storing unit 853 of the storage unit 85.

Further, the screen angle of clear toner can be randomly set for each lamé dot area. When lamé images are viewed from a given angle, the lamé effect can be observed because the glitter-particle area having glossiness and the glitter-particle area not having glossiness are mixed in the lamé image as above described. Further, by randomly setting the screen angle for clear toner, the directional anisotropy can be set for glossiness of each lamé dot area, by which a lamé image having different glossiness at each of lamé dot areas, depending on the viewing angles, can be formed. The directional anisotropy can be set for glossiness by changing the screen angle as shown in FIGS. 14A and 14B.

Figure 14A:
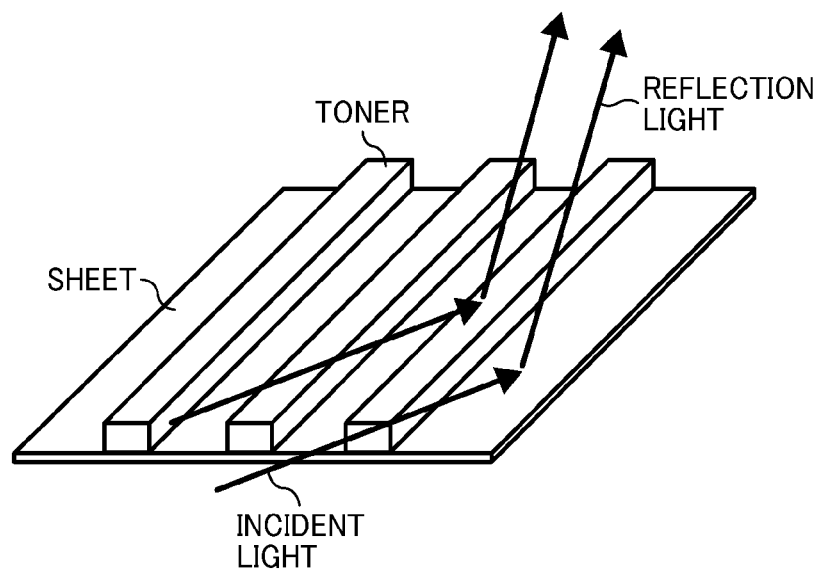
FIGS. 14A and 14B schematically show light reflection patterns from toner formed as line patterns on a recording sheet.
Figure 14B:
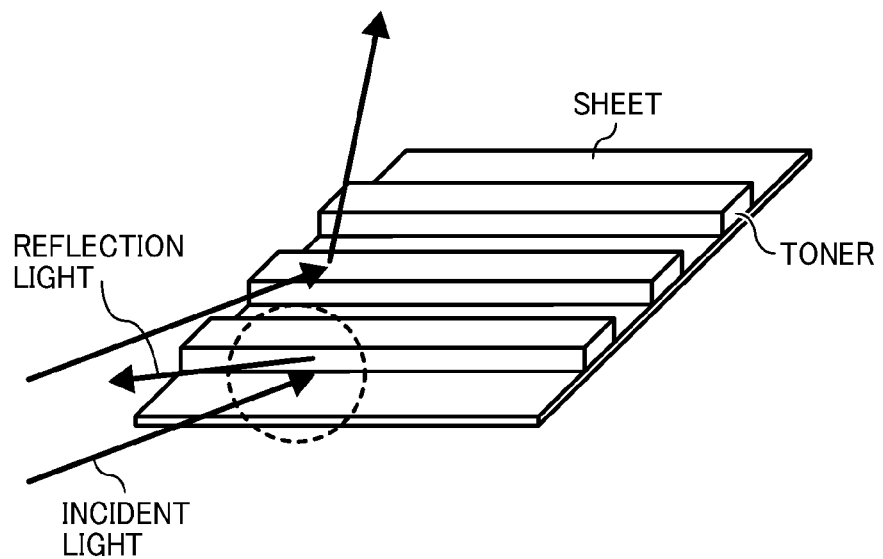

FIGS. 14A and 14B schematically show light reflection patterns from toner images formed as line patterns on a recording sheet. FIG. 14A shows a condition that the screen angle of toner images is parallel to the incidence light/reflection lights, and FIG. 14B shows a condition that the screen angle of toner images is perpendicular to the incidence light/reflection lights.

In a case of FIG. 14A, because the screen angle is parallel to the incidence light, the light that diffuses at the toner face may be little, and thereby the reflection light intensity becomes great, by which the glossiness can be increased. In a case of FIG. 14B, because the incidence light and concave-convex pattern of toner are perpendicular with each other, some toner may block the incidence light as a wall (see dot-circle area), by which the light diffuses at the toner face. Therefore, the reflection light intensity of FIG. 14B may become smaller than the reflection light intensity of FIG. 14A, by which the glossiness is decreased in a configuration of FIG. 14B.

As such, in the second example embodiment, by randomly setting the screen angle for each lamé dot area, the glossiness among the lamé dot areas can be set differently depending on the viewing angle, by which images having the enhanced lamé effect can be formed.

(Test 2)

To confirm the effect of the above described random setting, samples were prepared by conducting the above described random setting process, and then the subjective evaluation tests were conducted. The samples were prepared using the apparatus, colored-toner, and clear toner used for test 1. Among the clear toners used for test 1, clear toner having the 60-degree glossiness level of about 60% for solid clear image after the fusing process, manufactured by Ricoh Co. Ltd., was used. Further, the POD gloss coated paper used for test 1 was used as the recording sheets. The clear toner image adhered on the recording sheet was formed as line patterns having the line numbers of 212. Further, the dot area ratio was set randomly in the range of from 0 to 100%. The imaging process of printing can be conducted based on dots, AM screen, FM screen, and line pattern. In such printing, the pale/dark level of image cannot be set by analog manner, and thereby the low to high density of tiny dots are used to the pale/dark level of image. Further, the pale/dark level of image can be set by setting low to high density of thin lines. The line pattern having the line numbers of 212 was used for this example.

Further, the screen angle was set randomly in the range of from 0 to 360 degrees. The input image pattern used for test 1 was also used. The samples having the size of lamé dot area of 0.49 mm$^2$, and lamé dot numbers of 50 (dot numbers/cm$^2$) prepared for test 1-1 were used by further processing for randomly setting the dot area ratio and the screen angle to form the clear toner image. Such samples were compared to check the effect of second example embodiment.

As similar to test 1, the subjective evaluation tests of test 2 were evaluated by ten evaluation engineers. The results of test 2 indicate that all samples prepared by using the method of second example embodiment were evaluated as enhanced lamé image compared to samples prepared for other tests. As such, it was confirmed that images having enhanced lamé effect can be formed by forming images using the method of second example embodiment.

Third Example Embodiment

In the above described first and second example embodiments, the lamé dot area is not adhered with colored-toner. In a third example embodiment, a lamé image having a given color is formed by adhering colored-toner at the lamé dot area. In the above described first and second example embodiments, the lamé image is formed on a surface of a recording sheet, which may be white, and thereby such lamé image formed on the white surface may appear as silver-like image. In actual lamé printing, a color image may be present where a lamé image is to be formed. In the third example embodiment, a color lamé image is formed by adhering colored-toner at the lamé dot area.

In the third example embodiment, among the processes conducted by the image forming information processor 83, only the process conducted by the color level replacement unit 833 is different from the above described first and second example embodiments, and other configurations are same as the above described first and second example embodiments, and thereby the process for the third example embodiment conducted by the color level replacement unit 833 is described.

As similar to step S4 of FIG. 7, the color level replacement unit 833 replaces color level included in image forming information for lamé dot area using color level of each lamé dot area set in advance. To conduct the color level replacement, the color level replacement table stored in the color-level replacement information storing unit 85, stores grayscale values for each image forming information of R, G, B set in advance, and further, stores grayscale values set in advance for each image forming information of C, M, Y.

In the third example embodiment, a user can select a color for the lamé dot area using the input screen shown in FIG. 6. The color level replacement table stores given grayscale values for C, M, Y such as 0% to set a given color level, wherein the color information such as C, M, Y can be selected via the input screen shown in FIG. 6. The color level replacement table can store grayscale values for each image forming information of C, M, Y that satisfies given conditions in advance.

Hereinafter, a description is given of when a user selects the color of blue B for the lamé dot area. As shown in FIG. 8, the color level replacement table stores image forming information for blue B, which is one of the colors useable for image forming information. Specifically, the color level replacement table stores the grayscale value of C and M set as the image forming information for the blue B in advance. In the third example embodiment, the color level replacement table stores the grayscale value of "0 to 20%" for C and M for blue B as shown in FIG. 8. With such settings, the color level replacement unit 833 can randomly replace the grayscale value of C and M for blue B within the range of from 0 to 20%. In the third example embodiment, the upper limit of the grayscale value range may be set to 20% based on the test results, to be described later. The test results may indicate that the colored-toner image at the lamé dot area can create a more lamé effect when the density of colored-toner at the lamé dot area is low. The test results will be described as follows. As such, a color lamé image of the third example embodiment can be formed.

(Test 3)

To confirm whether the lamé effect changes depending on the whiteness degree of the lamé dot area, the subjective evaluation tests were conducted. The whiteness degree is a value to indicate whiteness of sample objects. The whiteness of sample objects can be computed by the following formula (1), in which color level of the object is expressed by (L,a,b).

$$\text{Whiteness} = 100 - \sqrt{[(100-L)^2 + (a^2 + b^2)]} \quad (1)$$

The (L,a,b) value is a color defined by Commission internationale de l'éclairage (CIE), and can be measured by a measurement device such as a colorimeter. In the third example embodiment, X-RITE 939 was used to measure color with the measurement conditions of light source using D50, 2-degree standard observer, and the measurement aperture of 4 mm. The formula (1) for computing whiteness degree is based on a whiteness degree computing method using Hunter whiteness degree (JIS-P8123) and Lab value. Samples were prepared using the apparatus, colored-toner, and clear toner used in tests 1 and 2. Among the clear toners used for tests 1 and 2, clear toner having the 60-degree glossiness level of about 60% for solid clear image after the fusing process, manufactured by Ricoh Co. Ltd., was used. Further, the POD gloss coated paper used in tests 1 and 2 was used as the recording sheets.

The clear toner image adhered on the recording sheet was formed as the line pattern having the line numbers of 212. Further, the dot area ratio was set randomly in the range of from 50 to 100%. Further, the screen angle was set randomly in the range of from 0 to 360 degrees. The input image pattern used for tests 1 and 2 were used. Further, the size of lamé dot area of 0.49 mm², and lamé dot numbers of 50 (dot numbers/cm²) were set, and the color of lamé dot color was set to blue. Further, samples were prepared by changing the dot area ratio of C toner and M toner from 1% to 25% in 1%-increments to change the image density and whiteness degree.

As similar to test 1, the subjective evaluation tests of test 3 were evaluated by ten evaluation engineers. FIG. 15 shows the results of test 3 using the same criteria of "x", "Δ", "○", "⊚" used for test 1. The results of test 3 indicate that when the dot area ratio of C and M color is 20% or less, and the whiteness degree is about 80 or more, the color lamé image, formed by adhering the colored-toner at the lamé dot area, can effectively create a lamé effect. As such, in the third example embodiment, it is preferable to adhere the colored-toner with the dot area ratio 20% or less.

Toner particles developed by different processes, materials, or makers may have different color densities or color appearance due to different pigment amounts in the resin particles. Therefore, when differently-developed toners are formed on a sheet such as paper even with the same dot area ratio (e.g., 50%), the color density of toner may become different among different toners such as dark for one toner, and pale for another toner. Therefore, a suitable relationship between the dot area ratio and whiteness degree may become different among different toners. Therefore, the dot area ratio is preferably set in view of the whiteness degree of sheet where toner is placed. For example, if toner A having dark color is used, the dot area ratio may be set 15% or less, and if toner B having pale color is used, the dot area ratio may be set 25% or less. The results of test 3 indicate that the lamé effect can be set high when the whiteness degree is 80 or more.

A decryption is given one theory of lamé effect caused by combining the whiteness degree and glossiness level. At first, the reason of high lamé effect when the whiteness degree is high can be assumed as follows. The lamé effect may be affected by several factors such as regular reflection light at toner surface, internal light diffusion in a transparent layer of toner, and light diffusion on surface of the recording sheet. If the adhering amount of colored-toner such as Y, M, C, K toner becomes great, the light diffused in the toner may decrease, by which the lamé effect such as glare may be suppressed, and thereby the lamé effect may become small.

Further, based on the result of glossiness level of FIG. 12, as above described for the results of subjective evaluation tests of test 1-2, it was found that the 60-degree glossiness level of lamé dot area is preferably set to a value greater than the glossiness level of non-lamé dot area of the solid image portion at least 10% or more to effectively set the lamé effect. If the glossiness difference is less than 10%, the lamé effect may become smaller, although the lamé effect can be observed.

The results of subjective evaluation tests of test 1-2 (FIG. 12) further indicate that the 60-degree glossiness level of lamé dot area is preferably set to the glossiness level of 20% or more to effectively set the lamé effect.

As such, even if the whiteness degree of lamé dot area is high, if the glossiness level of lamé dot area is smaller than the glossiness level of non-lamé dot area, or if the glossiness level of lamé dot area is a given level or less, the intensity of reflection light at the surface of lamé dot area may not become high enough, in which the lamé effect such as glare of lamé image may become small.

Based on the test results, it can be assumed that the lamé dot area needs to satisfy given conditions for the factors of whiteness degree and glossiness level to create an effective lamé effect. For example, based on the test results, the lamé dot area may need to have "Hunter whiteness degree of 80 or more," "glossiness level of lamé dot area is 20% or more," and "60-degree glossiness level of lamé dot area is greater than 60-degree glossiness level of non-lamé dot area for 10% or more." In the third example embodiment, the C and M color can be set randomly in the range of from 0 to 20%. Further, the C and M color can be set to a fixed value within the range of 0 to 20%, or a user can set a value within the range of from 0 to 20%. As such, a color lamé image of third example embodiment can be formed preferably.

The above described example embodiments executable by inputting lamé condition information can be applied to form images having a hologram effect by designating the color for each of lamé dot area, and setting a given pattern for color arrangement. In such a case, instead of designating the color for each lamé dot area by a user, a plurality of colors may be automatically selected and assigned to each lamé dot area. Further, the shape is not limited to one pattern, but a plurality of patterns can be set by the user, in which the user can form lamé images having different lamé effects by selecting different patterns for lamé images. Further, by disposing an operation panel such as a touch panel and a touch pen, any shape patterns can be prepared by a user's operation on the operation panel such as writing a shape using the touch pen. Such operation panel can be used as a shape designation unit to designate the shape of lamé dot area.

In the above described third example embodiment, lamé images formed of lamé particles having set with different shapes, different size, and different image density can be formed. Conventionally, a special printing to form lamé images requires various types of image forming agent such as ink to form lamé images with different shapes, different size, and different image density, which may increase the cost. In the above described example embodiments, without such agent or material accommodation, an image forming apparatus that can easily change shape, size, or the like can be provided.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus, comprising:
an image forming information processor to process image forming information converted from image information input to the image forming apparatus, the image forming information processor including:
a first area determination unit to determine a processing area from the image forming information;
a second area determination unit to determine a plurality of specific areas included in the processing area determined by the first area determination unit as processing-required part;
a color level changing unit to change color level of image forming information corresponding to the plurality of specific areas;
a colored-toner image forming information generator to generate colored-toner image forming information based on the image forming information having the color level changed by the color level changing unit; and
a glossy toner image forming information generator to generate glossy toner image forming information based on the image forming information corresponding to the plurality of specific areas; and
an image forming unit to form an image on a recording medium by forming a toner image using colored-toner, and a toner image using glossy toner based on the image forming information processed by the image forming information processor,
wherein the image forming unit forms a glossy image on the recording medium based on the glossy toner image forming information, in which the glossy image is formable on the recording medium using the colored-toner toner image alone, or the glossy image is formed on the recording medium by forming a colored-toner toner image using colored-toner based on the colored-toner image forming information, and then forming the glossy toner image on the colored-toner toner image as a top layer of the glossy image based on the glossy toner image forming information,
wherein the color level changing unit conducts a color level changing process by setting given optical properties of images formed in the specific areas, and by setting a difference between optical properties of images formed in the specific areas and optical properties of images formed in a non-specific-area different from the specific areas,
wherein the optical properties include glossiness level of images and Hunter whiteness degree, and
wherein the color level changing unit conducts a color level changing process by setting a given glossiness level and a given Hunter whiteness degree for images formed in the specific areas, and by setting a difference between the glossiness level of images formed in the specific areas and the glossiness level of images formed in the non-specific-area.

2. The image forming apparatus of claim 1, wherein the optical properties include a glossiness level of the image, wherein the color level changing unit executes a color level changing process by setting given glossiness level of images formed in the specific areas, and by setting a difference between the glossiness level of images formed in the specific areas and the glossiness level of images formed in the non-specific-area.

3. The image forming apparatus of claim 2, wherein the images formed in the specific areas have a 60-degree glossiness level of 20% or more, and a difference between 60-degree glossiness level of the images formed in the specific areas and 60-degree glossiness level of the images formed in the non-specific-areas is 10% or more.

4. The image forming apparatus of claim 1, wherein the image formed at the specific area has a 60-degree glossiness level of 20% or more and a Hunter whiteness degree of 80 degrees or more, and a difference between the 60-degree glossiness level of the image formed at the specific area and the 60-degree glossiness level of images formed in the non-specific-area is 10% or more.

5. The image forming apparatus of claim 1, wherein the color level changing unit changes the color levels at the specific areas to colorless.

6. The image forming apparatus of claim 1, wherein the color level changing unit changes the color level at the specific areas to color.

7. The image forming apparatus of claim 1, wherein the color level changing unit changes the color levels, and assigns the changed color level randomly to each of the specific areas.

8. The image forming apparatus of claim 1, wherein the glossy toner image forming information generated by the glossy toner image forming information generator assigns screen angles of glossy toner adhered by the image forming unit randomly to each of the specific areas.

9. The image forming apparatus of claim 1, wherein the glossy toner image forming information generated by the glossy toner image forming information generator assigns adhering amounts of glossy toner adhered by the image forming unit randomly to each of the specific areas.

10. The image forming apparatus of claim 1, wherein the numbers of specific areas per unit area designated by the second area determination unit is $50/cm^2$ or more.

11. The image forming apparatus of claim 1, wherein a size of each of the specific areas designated by the second area determination unit is 1 $mm^2$ or less.

12. The image forming apparatus of claim 1, wherein the second area determination unit randomly assigns positions to each of the specific areas.

13. The image forming apparatus of claim 1, wherein the second area determination unit randomly assigns sizes to each of the specific areas.

14. The image forming apparatus of claim 1, further comprising a shape designation unit that designates a shape of the specific areas,
   wherein the second area determination unit sets the designated shape of the specific areas.

15. An image forming information processing apparatus comprising the image forming information processor of claim 1.

* * * * *